US007984549B2

(12) United States Patent
Osaki

(10) Patent No.: US 7,984,549 B2

(45) Date of Patent: Jul. 26, 2011

(54) METHOD OF MANUFACTURING INK-JET RECORDING HEAD

(75) Inventor: Yasuhiko Osaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 150 days.

(21) Appl. No.: 12/552,981

(22) Filed: Sep. 2, 2009

(65) Prior Publication Data

US 2010/0058576 A1 Mar. 11, 2010

(30) Foreign Application Priority Data

Sep. 11, 2008 (JP) ................................ 2008-233335

(51) Int. Cl.

*B21D 53/76* (2006.01)
*B23P 17/00* (2006.01)
*B41J 2/15* (2006.01)
*B41J 2/145* (2006.01)

(52) U.S. Cl. ........................................ 29/890.1; 347/40

(58) Field of Classification Search ................. 29/890.1, 29/25.35; 347/20, 40, 44–45; 310/311, 316.01, 310/317

See application file for complete search history.

(56) References Cited

U.S. PATENT DOCUMENTS 5,198,054 A * 3/1993 Drake et al. .................... 156/64
6,490,792 B1 * 12/2002 Ishinaga et al. .............. 29/890.1
6,725,543 B2 * 4/2004 Sarojiniamma et al. ...... 29/890.1
6,959,471 B2 * 11/2005 Temple et al. ............... 29/25.35
7,134,172 B2 * 11/2006 Sakamoto et al. ........... 29/25.35
7,278,210 B2 * 10/2007 Howitz et al. ................ 29/890.1
7,281,330 B2 * 10/2007 Silverbrook et al. ........ 29/890.1
2006/0221138 A1 * 10/2006 Furukawa et al. .............. 347/56
2007/0046738 A1 * 3/2007 Yagi et al. ....................... 347/71
2007/0295206 A1 * 12/2007 Ishizawa et al. .................. 95/46

FOREIGN PATENT DOCUMENTS

EP 390487 A2 10/1990
JP 2003-525786 T 9/2003
WO 01/67514 A1 9/2001
WO 0166357 A1 9/2001
WO WO0166357 * 9/2001

* cited by examiner

*Primary Examiner* — A. Dexter Tugbang
*Assistant Examiner* — David P Angwin
(74) *Attorney, Agent, or Firm* — Canon USA, Inc. IP Div

(57) ABSTRACT

In a method of manufacturing an ink-jet recording head including plural recording element substrates having at least one nozzle array comprising nozzles to eject ink, an electric wiring member supplying signals to the recording element substrates, a member supporting the recording element substrates and the electric wiring member, electric connecting portions electrically interconnecting the recording element substrates and the electric wiring member, and a sealant sealing the electric connecting portions, the method comprises the steps of applying sealants to the supporting member including the recording element substrates, the electric wiring member, and the electric connecting portions, and curing the sealants, measuring a distance between reference positions set on each recording element substrate before and after the curing of the sealants, and mounting the recording element substrates to the supporting member depending on a difference in the distance between the reference positions measured before and after the curing of the sealants.

8 Claims, 17 Drawing Sheets

METHOD OF MANUFACTURING INK-JET RECORDING HEAD

BACKGROUND OF THE INVENTION

1. Field of the Invention

The present invention relates to a method of manufacturing an ink-jet recording head.

2. Description of the Related Art

Hitherto, ink-jet recording apparatuses have been widely commercialized and utilized in, e.g., output devices of computers, etc, for the reasons that the running cost is relatively low, the apparatus size can be reduced, and the ink-jet recording apparatus is easily adaptable for color image recording using inks of plural colors.

On the other hand, an energy generating element for generating energy to eject ink from an ejection orifice of a recording head is practiced, for example, as the type using an electro-mechanical transducer, e.g., a piezoelectric element, or the type irradiating electromagnetic waves emitted from, e.g., a laser for heating ink and ejecting ink droplets by the action of the heating. Another known example of the energy generating element is the type heating a liquid by an electro-thermal transducer having a heating resistor.

In particular, a recording head of the ink-jet recording of the type ejecting ink droplets by utilizing thermal energy is advantageous in that ejection orifices can be arrayed at a high density and an image can be recorded at a high resolution. Above all, a recording head using an electro-thermal transducer as energy generating element is effective in easily reducing a head size. Further, the recording head using the electro-thermal transducer is advantageous in that the recording head can be manufactured by sufficiently utilizing merits of the IC techniques and the micro-machining techniques where advancement and reliability have been recently progressed and improved to a remarkable extent in semiconductor fields, and that the recording head can be easily manufactured at a higher density packing and at a lower cost.

In recent years, a method of manufacturing a nozzle, which ejects ink, with a high degree of accuracy by employing the photolithography has also been utilized to perform recording at a higher definition. Of late, a recording head having a longer recording width is further demanded from the viewpoint of realizing recording of an image at a higher speed and a higher definition. More specifically, there is a demand for a recording head with a length of 10.16 cm (4 inches) to 30.48 cm (12 inches), for example.

When trying to realize the recording head having such a long recording width by forming a larger number of recording elements on a single recording element substrate, the length of the recording element substrate is so increased as to cause the problem that the recording element substrate is more susceptible to, e.g., cracks and warping. Another problem of the recording element substrate having a very long size is that the yield of the recording element substrate itself reduces in the manufacturing process.

One proposal for overcoming the above-mentioned problems is to arrange, on an integral carrier, a plurality of recording element substrates each having a nozzle array which includes an appropriate number of nozzles, and to realize a recording head having a large recording width as a whole. The proposed construction requires that nozzles of the recording element substrates adjacent to each other are partly overlapped and are accurately arranged to prevent gaps and overlaps from generating in a printed image. In particular, when photographic print is intended or when an even longer recording head is to be formed, requirements for the accuracy in nozzle positions are further increased. Above all, in an overlapped region between the recording element substrates adjacent to each other, a deviation of the nozzle position is more apt to appear as a streak in the printed result, and the nozzle position is especially required to satisfy an even higher degree of accuracy.

PCT Japanese Translation Patent Publication No. 2003-525786 discloses a method for coping with the problem that thermal expansion generated by a temperature rise during the use causes an alignment failure of a head module due to a difference in linear expansion between the head module and a supporting member. With the disclosed method, the head module is held in a properly aligned state at the temperature during the use, while it is not in the properly aligned state at temperatures other than that during the use.

However, the disclosed method is just intended to cope with the position deviation caused by the difference between the temperature during the manufacturing and the temperature during the use. In other words, the disclosed method does not take into consideration various deviations that may generate in the recording element substrate throughout the entire manufacturing process. If those various deviations generate, the recording element substrate and the positions of nozzles formed therein cannot be arranged at the intended positions with a high degree of accuracy.

SUMMARY OF THE INVENTION

An exemplary embodiment of the present invention provides a method of manufacturing an ink-jet recording head, which enables respective positions of recording element substrates after a manufacturing process to be arranged at the desired positions with a high degree of accuracy.

According to the exemplary embodiment of the present invention, in a method of manufacturing an ink-jet recording head including a plurality of recording element substrates each having at least one nozzle array comprising a plurality of nozzles to eject ink, an electric wiring member arranged to supply signals to the plurality of recording element substrates, a supporting member arranged to support the plurality of recording element substrates and the electric wiring member, electric connecting portions electrically interconnecting the recording element substrates and the electric wiring member, and a sealant sealing the electric connecting portions, the method comprises the steps of applying sealants to the supporting member including the recording element substrates, the electric wiring member, and the electric connecting portions, and curing the applied sealants by heating and cooling the sealants, measuring a distance between at least two reference positions set on each of the recording element substrates before and after the curing of the sealants, and mounting the plurality of recording element substrates to the supporting member depending on a difference in the distance between the reference positions measured in the measuring step before and after the curing of the sealants.

With the exemplary embodiment of the present invention, the method of manufacturing the ink-jet recording head can be provided which enables respective positions of the recording element substrates after the manufacturing process to be arranged at the desired positions with a high degree of accuracy.

Further features of the present invention will become apparent from the following description of exemplary embodiments with reference to the attached drawings.

DESCRIPTION OF THE EMBODIMENTS

An ink-jet recording head and a method of manufacturing the ink-jet recording head, according to one exemplary embodiment of the present invention, will be described below with reference to the drawings.

The construction of the ink-jet recording head according to the exemplary embodiment is first described.

Figure 1A:
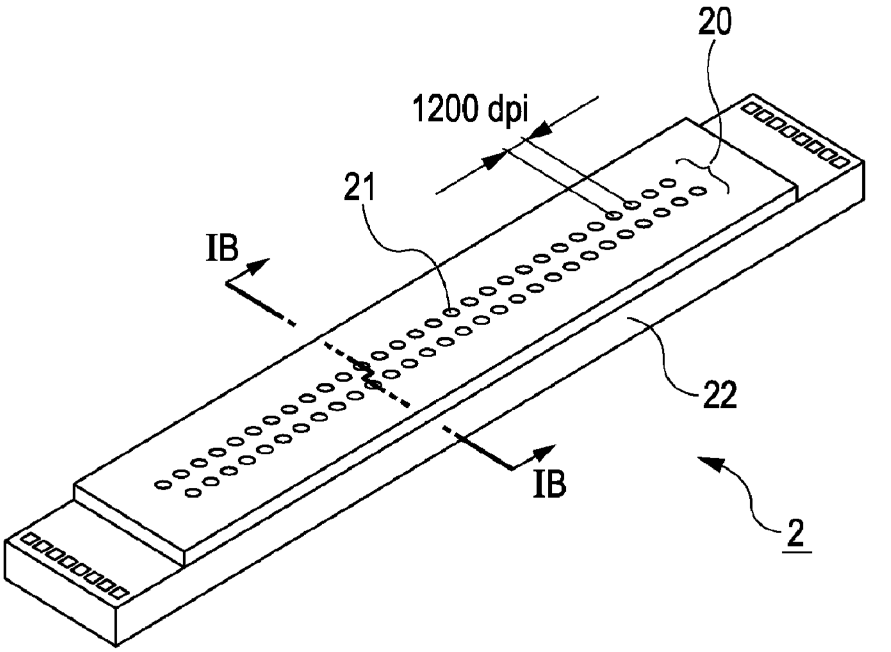
FIGS. 1A and 1B are respectively a perspective view and a sectional view illustrating, in the simplified form, a recording element substrate according to one exemplary embodiment of the present invention.
Figure 1B:
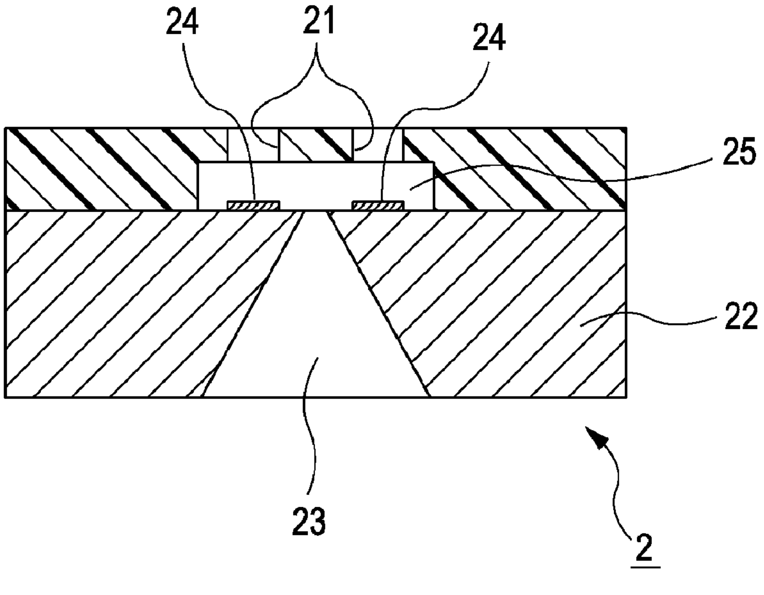
Figure 2:
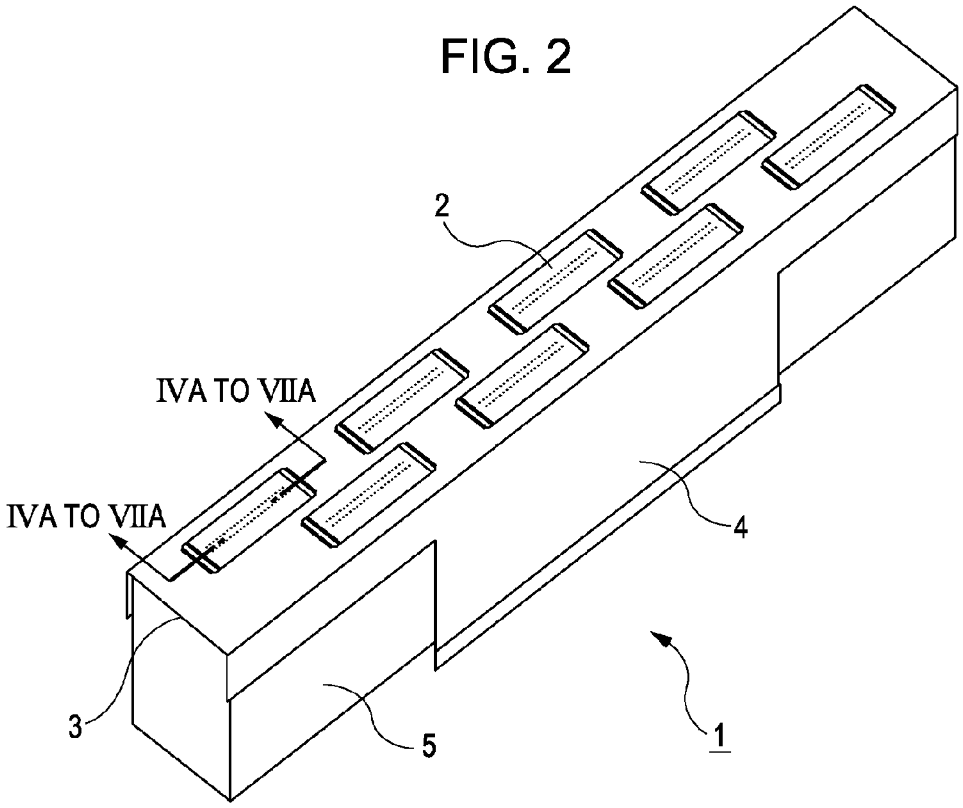
FIG. 2 is a perspective view illustrating, in the simplified form, an ink-jet recording head according to the exemplary embodiment of the present invention.

FIGS. 1A and 1B are respectively a perspective view and a sectional view illustrating, in the simplified form, a recording element substrate 2 used in an ink-jet recording head 1 according to the exemplary embodiment, and FIG. 2 is a perspective view illustrating, in the simplified form, the ink-jet recording head 1 according to the exemplary embodiment. FIG. 1B is a sectional view taken along a line IB-IB in FIG. 1A.

As illustrated in FIG. 1A, the recording element substrate 2 according to the exemplary embodiment has two nozzle arrays 20 each including a plurality of nozzles 21 to eject ink therefrom. The two nozzle arrays 20 are arranged parallel to each other. The recording element substrate 2 is made of a Si substrate 22. As illustrated in FIG. 1B, a liquid supply port 23 for supplying ink to the nozzles 21 is bored in a central portion of the Si substrate 22 so as to penetrate the substrate from its front surface to its rear surface. On the front surface of the Si substrate 22, a plurality of electro-thermal transducers 24 are disposed at predetermined positions. A bubble generating chamber 25 and the nozzles 21 for ejecting the ink are formed by a member made of, e.g., a polymer in a corresponding relation to the electro-thermal transducers 24. In the exemplary embodiment, each of the nozzles 21 has a nozzle diameter of 12 μm and an ejected ink amount of about 3 pl (picoliter). The nozzles 21 form the nozzle array 20 at a pitch of 1200 dpi, i.e., about 21 μm, in the lengthwise direction thereof.

As illustrated in FIG. 2, the ink-jet recording head 1 according to the exemplary embodiment includes eight recording element substrates 2 which are mounted on a supporting member 3 in two zigzag arrays, and the supporting member 3 which supports the recording element substrates 2. The recording element substrates 2 are each fixedly bonded to the supporting member 3 by using an adhesive, for example. The ink-jet recording head 1 further includes an electric wiring member 4 on which are formed electric wirings (not shown) for supplying signals to the recording element substrates 2. The electric wiring member 4 has a plurality of openings 40 (FIG. 5B) capable of accommodating the recording element substrates 2, respectively. The openings 40 are formed such that, in a state where the electric wiring member 4 is fixedly bonded to the supporting member 3, the recording element substrates 2 are positioned respectively in the openings 40 of the electric wiring member 4. A liquid supply member 5 for supplying the ink to the recording element substrates 2 is joined to the underside of the supporting member 3. In the exemplary embodiment in which eight recording element substrates 2 are mounted on the ink-jet recording head 1, the entire head has a recording width of about 15.75 cm (about 6.2 inches).

Figure 3:
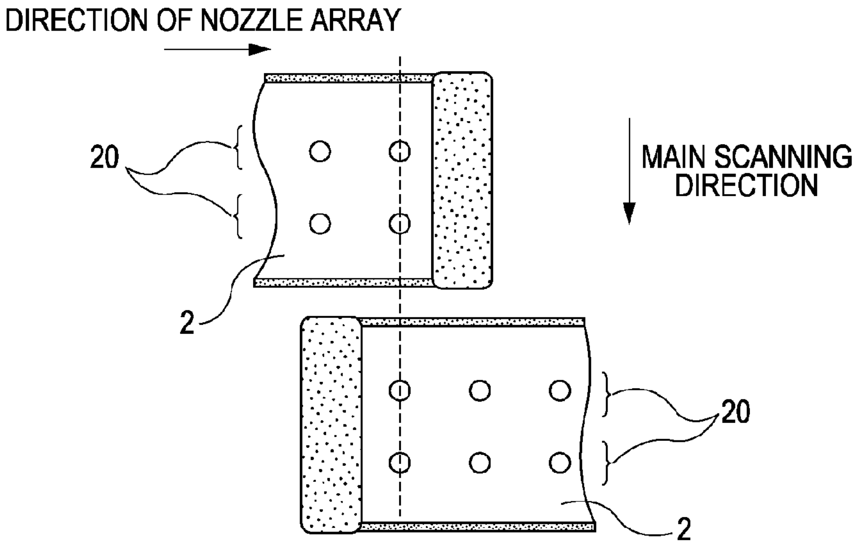
FIG. 3 is a plan view illustrating, in an enlarged scale, parts of two recording element substrates according to the exemplary embodiment of the present invention.

FIG. 3 is a plan view illustrating layout (positions) of two recording element substrates 2 according to the exemplary embodiment on the supporting member 3.

Each pair of recording element substrates adjacent to each other in a direction (main scanning direction) perpendicular to the direction of the nozzle array 20 in the ink-jet recording head 1 are arranged such that nozzle positions at respective nozzle array ends, which are located close to each other, are overlapped (see a dotted line in FIG. 3) as viewed in the main scanning direction. With such an arrangement that the nozzle positions in the recording element substrates 2 adjacent to each other in the main scanning direction are properly overlapped as viewed in the main scanning direction, it is possible to realize the ink-jet recording head 1 which can prevent gaps and overlaps from generating in a printed image, and which can perform recording of the image at a high definition.

The highly accurate arrangement of the nozzle positions is achieved with the method of manufacturing the ink-jet recording head according to the exemplary embodiment. The manufacturing method will be described in detail below.

Regarding the process of manufacturing the ink-jet recording head, particularly, part from a step of mounting the recording element substrates 2 to the supporting member 3 to a step of sealing those substrates with a sealant is first described with reference to FIGS. 4 to 7. FIGS. 4A, 5A, 6A and 7A are each a sectional view taken along a line IVA to VIIA-IVA to VIIA in FIG. 2, and FIGS. 4B, 5B, 6B and 7B are each a plan view of the recording element substrate 2 mounted on the supporting member 3.

Figure 4A:
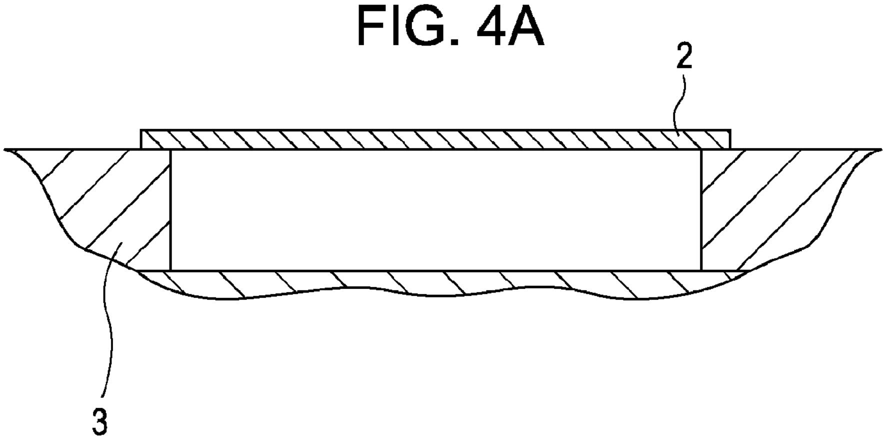
FIGS. 4A and 4B are explanatory views illustrating a method of manufacturing the ink-jet recording head according to the exemplary embodiment of the present invention.
Figure 4B:
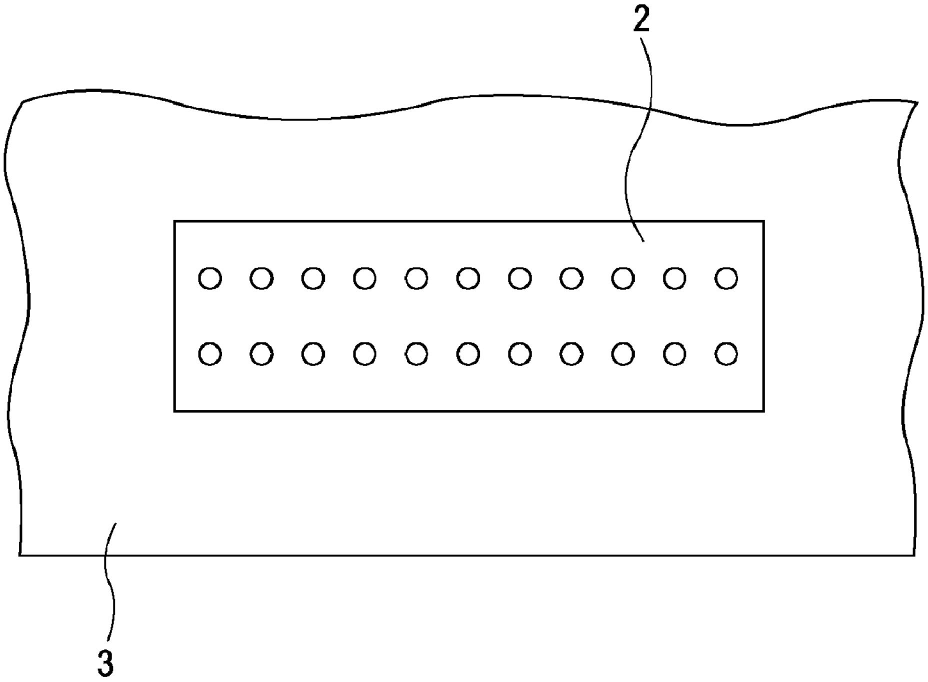

FIGS. 4A and 4B illustrate a state where the recording element substrate 2 is mounted to the supporting member 3 and is fixed in place by using an adhesive. The recording element substrate 2 includes electrodes (not shown) formed at each of opposite ends thereof to send electric power and recording signals to the electro-thermal transducers 24 of the recording element substrate 2 from the outside.

Figure 5A:
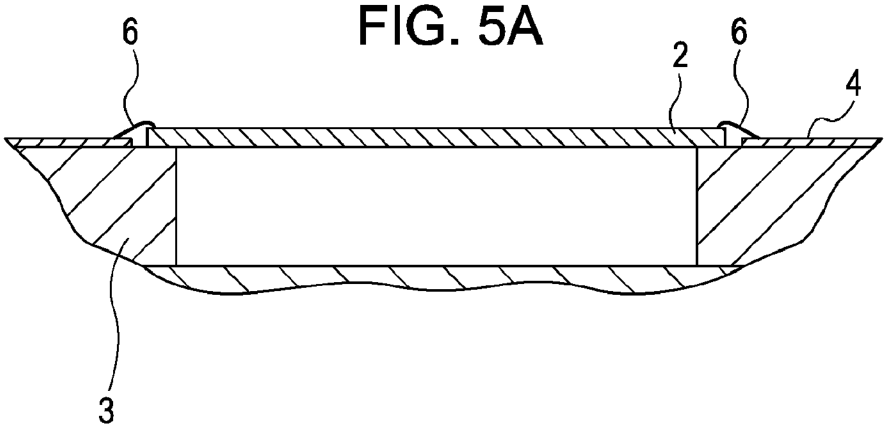
FIGS. 5A and 5B are explanatory views illustrating the method of manufacturing the ink-jet recording head according to the exemplary embodiment of the present invention.
Figure 5B:
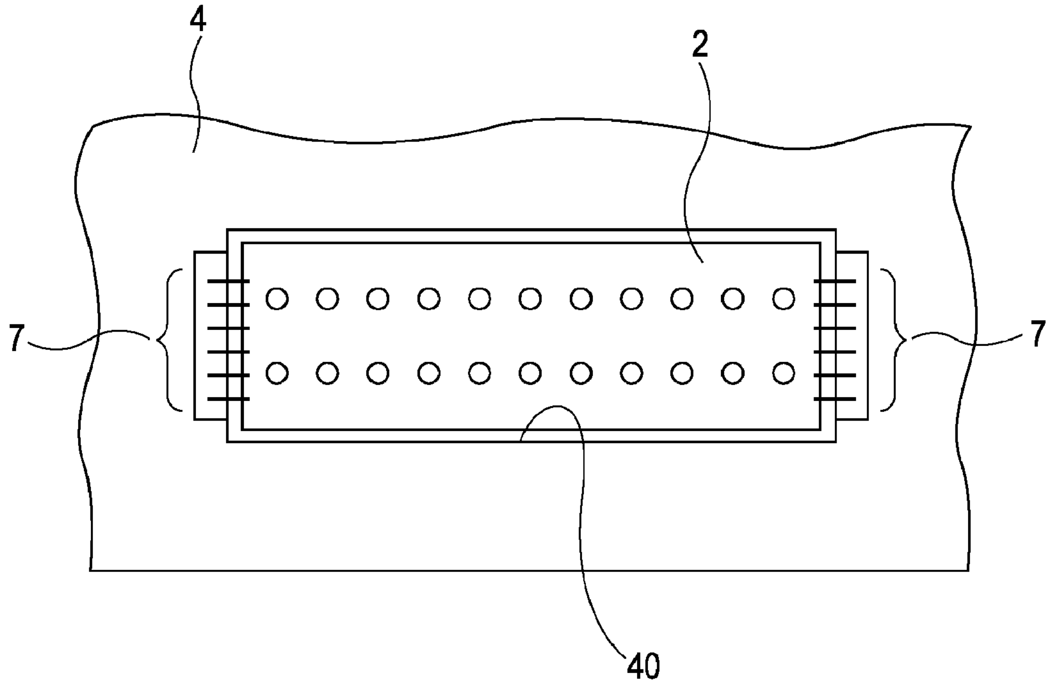

Next, as illustrated in FIGS. 5A and 5B, the electric wiring member 4 is fixedly bonded to the supporting member 3 such that the recording element substrate 2 is positioned in the opening 40 which is formed in size slightly larger than the recording element substrate 2. Thereafter, electric wiring portions 7 are formed by electrically connecting the electrodes of the recording element substrate 2 and electrodes (not shown) of the electric wiring member 4 through wires 6, i.e., by wire bonding, for example.

Figure 6A:
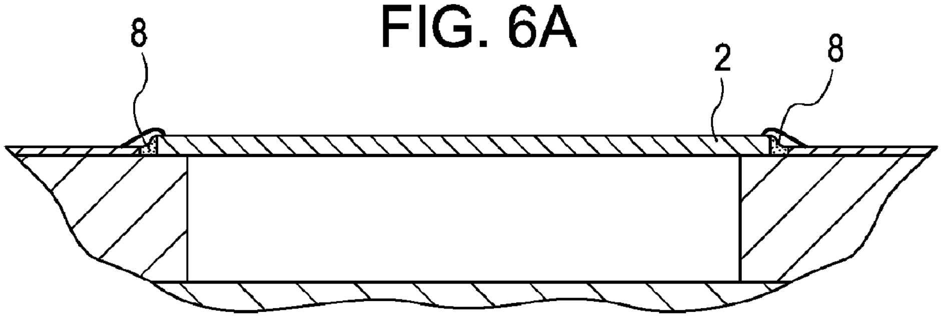
FIGS. 6A and 6B are explanatory views illustrating the method of manufacturing the ink-jet recording head according to the exemplary embodiment of the present invention.
Figure 6B:
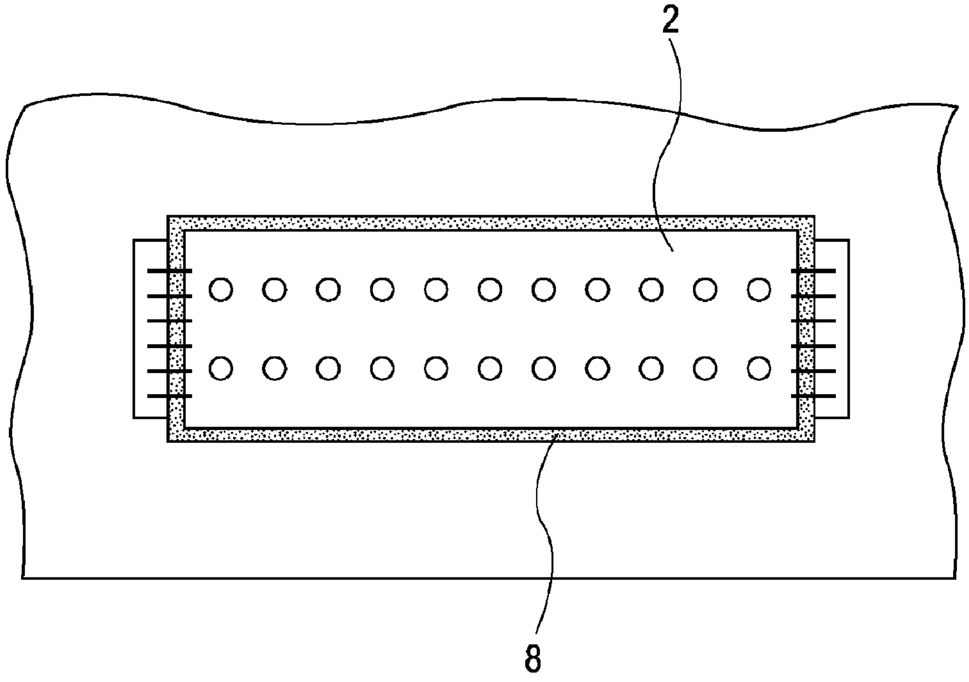
Figure 7A:
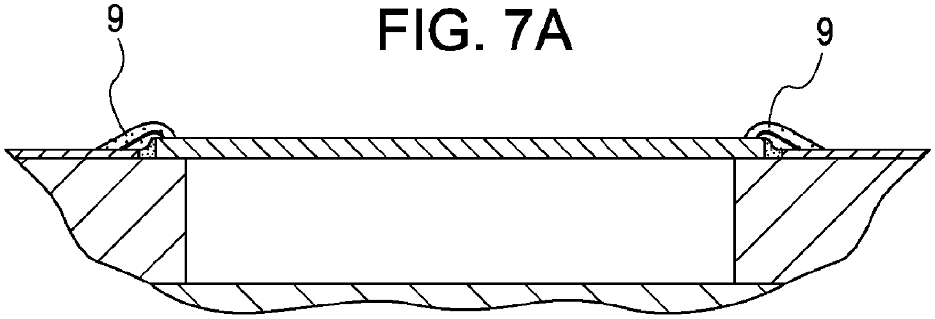
FIGS. 7A and 7B are explanatory views illustrating the method of manufacturing the ink-jet recording head according to the exemplary embodiment of the present invention.
Figure 7B:
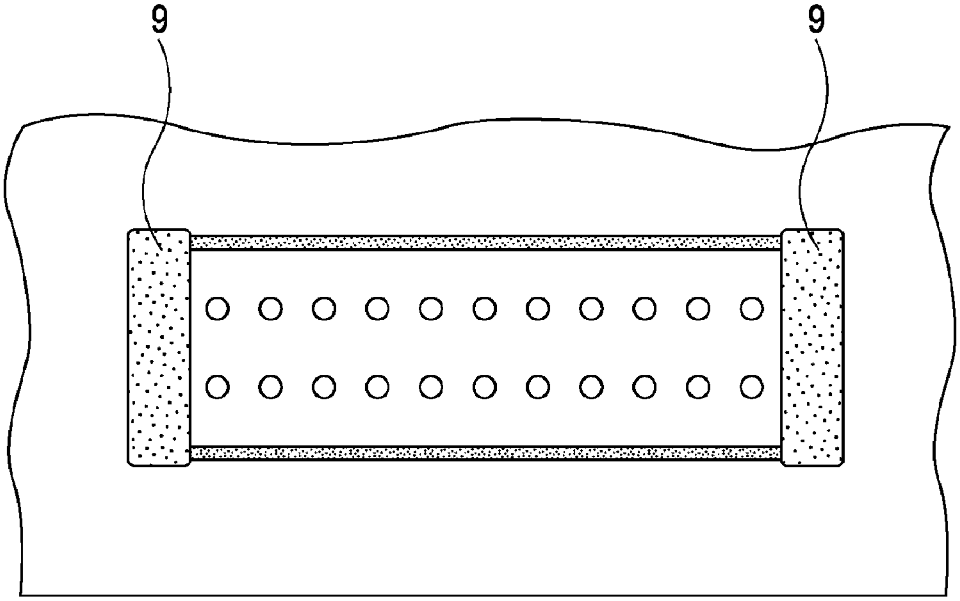

Next, as illustrated in FIGS. 6A and 6B, a first sealant 8 is coated around the recording element substrate 2 to protect an outer periphery of the recording element substrate 2. Successively, as illustrated in FIGS. 7A and 7B, a second sealant 9 is coated so as to cover the electric wiring portions 7 for protecting the electric wiring portions 7. The first sealant 8 and the second sealant 9 are then cured, whereby a unit of the recording element substrate is completed.

In the above-described process, the first sealant 8 serves to protect and reinforce sides of the recording element substrate 2. The second sealant 9 serves to protect the electric wiring portions 7. The first sealant 8 and the second sealant 9 are fixed to the supporting member 3 and/or the electric wiring member 4. The second sealant 9 is desirably made of a material having a high elastic modulus from the viewpoint of protecting the electric wiring portions 7 against externally applied impacts. On the other hand, from the viewpoint of ensuring high reliability for a long term, it is effective that the first sealant 8 and the second sealant 9 are made of materials of the same type for close adhesion therebetween. In such a case, the first sealant 8 is also made of a material having a high elastic modulus.

When the material having a high elastic modulus is used as the first sealant 8 to seal off the surroundings of the recording element substrate 2, there is a possibility that a deformation of the recording element substrate 2 itself and a positional deviation of the recording element substrate 2 on the supporting member 3 may occur due to the following mechanism during the above-described manufacturing process.

The deformation and the positional deviation of the recording element substrate 2, which may occur during the manufacturing process of the ink-jet recording head 1, will be described below with reference to FIGS. 8 to 11.

FIGS. 8 to 11 are explanatory views illustrating the step of sealing off the surroundings of the recording element substrate 2 and the electric wiring portions 7 formed between the recording element substrate 2 and the electric wiring member 4 with the first sealant 8 and the second sealant 9, respectively. FIGS. 8 to 11 are each an enlarged sectional view of the electric wiring portion 7.

Figure 8:
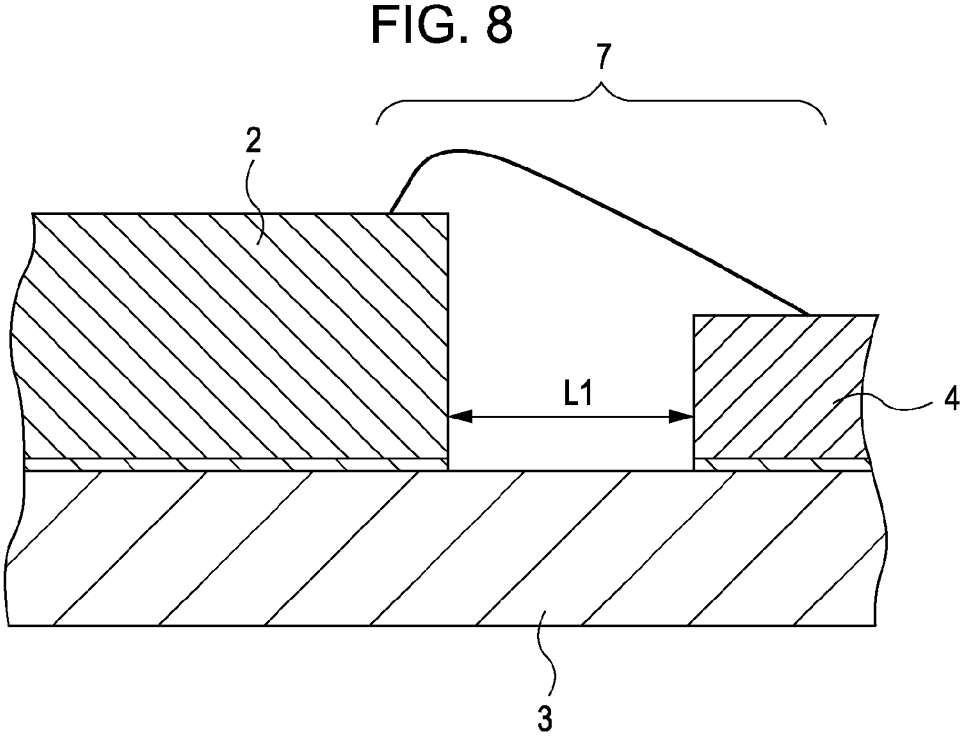
FIG. 8 is an explanatory view illustrating the method of manufacturing the ink-jet recording head according to the exemplary embodiment of the present invention.

FIG. 8 illustrates a state at a point in time where the recording element substrate 2 and the electric wiring member 4 are fixed to the supporting member 3 and electrical connection is completed (i.e., the electric wiring portion 7 is formed). An interval (spacing) between the recording element substrate 2 and the electric wiring member 4 in the state of FIG. 8 is assumed to be L1.

Figure 9:
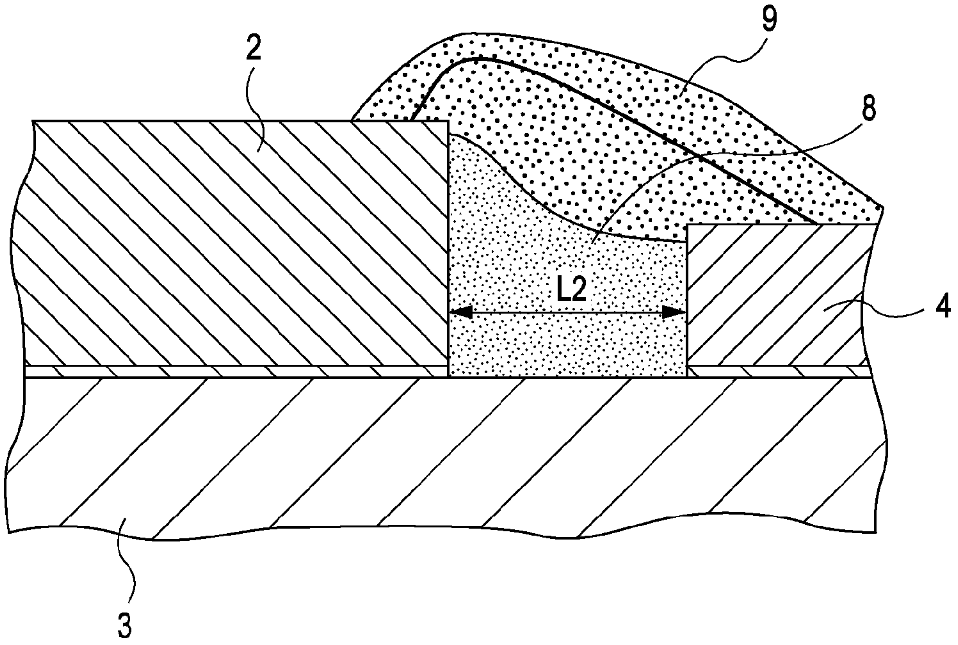
FIG. 9 is an explanatory view illustrating the method of manufacturing the ink-jet recording head according to the exemplary embodiment of the present invention.

FIG. 9 illustrates a state at a point in time where the recording element substrate 2 and the electric wiring member 4 are coated with the first sealant 8 and the second sealant 9. The length along which the first sealant 8 and the supporting member 3 contact with each other, i.e., an interval (spacing) between the recording element substrate 2 and the electric wiring member 4, in the state of FIG. 9 is assumed to be L2. In this state, the relationship of L2=L1 still holds.

Figure 10:
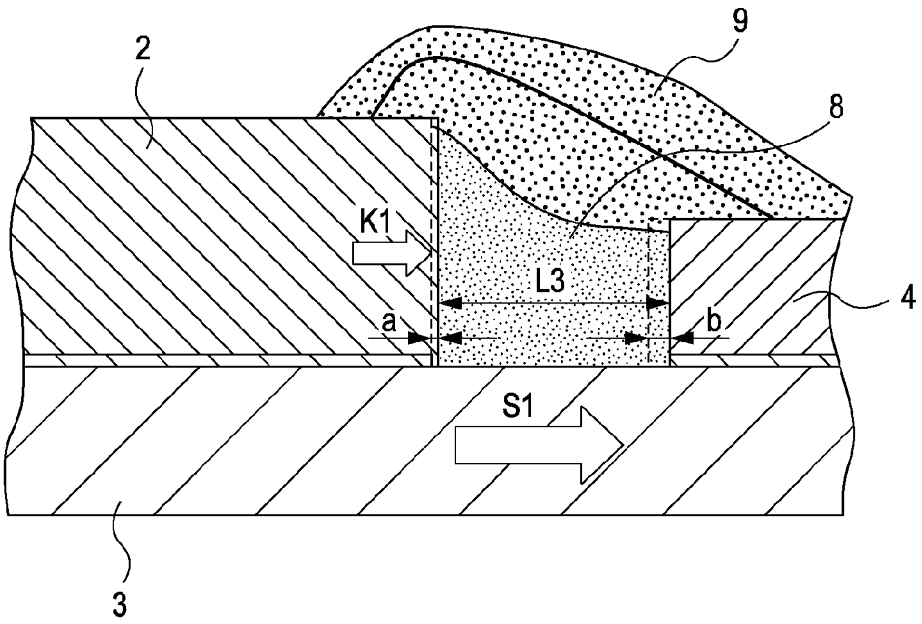
FIG. 10 is an explanatory view illustrating the method of manufacturing the ink-jet recording head according to the exemplary embodiment of the present invention.

FIG. 10 illustrates states of relevant components at a curing temperature at which the first and second sealants 8 and 9 are cured. At that time, the recording element substrate 2 and the supporting member 3 are expanded with a temperature rise (as indicated respectively by arrows K1 and S1 in FIG. 10). Accordingly, an interval (spacing) L3 between the recording element substrate 2 and the electric wiring member 4 in the state of FIG. 10 is changed from the intervals L1 and L2. In the exemplary embodiment, because the linear expansion rate of the supporting member 3 is larger than that of the recording element substrate 2, the relationship of (L1=L2)<L3 is resulted. The sealants are cured in the heating step. To describe in more detail with reference to FIG. 10, the recording element substrate 2, the supporting member 3, and the electric wiring member 4 are expanded by the action of heat generated in the thermal curing step. Therefore, the end of the recording element substrate 2 displaces by a distance a and the end of the electric wiring member 4 displaces by a distance b to the right as viewed in FIG. 10.

Figure 11:
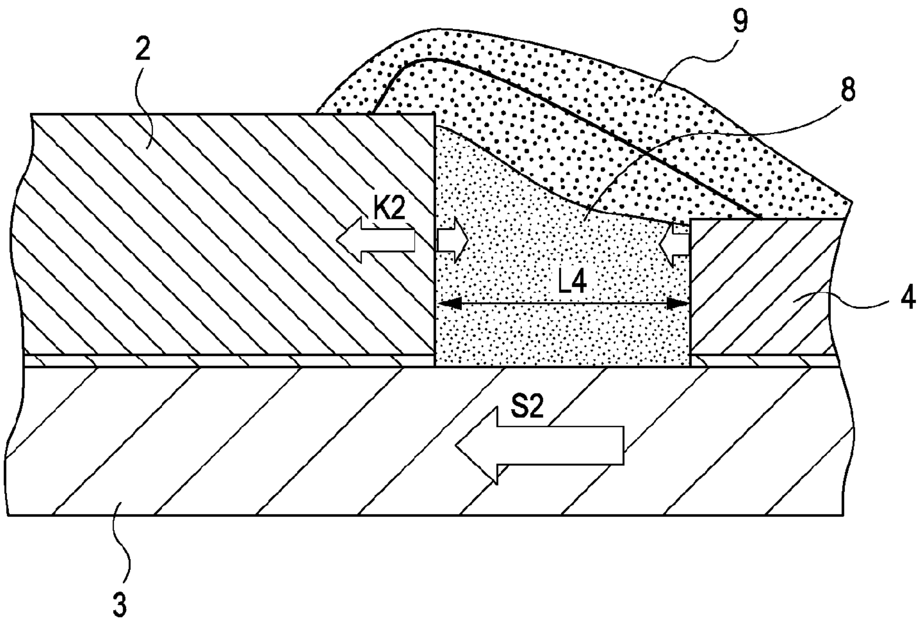
FIG. 11 is an explanatory view illustrating the method of manufacturing the ink-jet recording head according to the exemplary embodiment of the present invention.

FIG. 11 illustrates a state where, after the curing of the first and second sealants 8 and 9, the temperatures of the relevant components have returned to room temperature and the recording element substrate 2 and the supporting member 3 have contracted with a temperature fall (as indicated respectively by arrows K2 and S2 in FIG. 11). If the sealants 8 and 9 are not present, an interval (spacing) L4 between the recording element substrate 2 and the electric wiring member 4 in the state of FIG. 11 is equal to the intervals L1 and L2. However, when the sealants 8 and 9 have difference linear expansion rates from that of, in particular, the supporting member 3, the interval L4 is changed from the intervals L1 and L2 before the end of the curing. Accordingly, stresses are imposed on the recording element substrate 2, thus causing the deformation and the positional deviation of the recording element substrate 2. The generated stresses increase particularly when the elastic modulus of the first sealant 8 is high. Because the sealants are already cured in the state of FIG. 11, the recording element substrate 2 contracts to such an extent as exceeding the distance through which it has expanded. Thus, the relationship of (L1=L2)<L4<L3 is resulted. In other words, the end of the recording element substrate 2 displaces by a distance a' to the left as viewed in FIG. 11. Because the sealants 8 and 9 have already been cured, the relationship of a<a' holds.

The amount by which the recording element substrate 2 deforms and its position deviates eventually is determined depending on mainly the following parameters:

Linear expansion rate, dimensions, and elastic modulus of the recording element substrate 2

Linear expansion rate, dimensions, and elastic modulus of the supporting member 3

Linear expansion rates, elastic moduli, amounts, and curing temperature of the sealants 8 and 9

Dimensions of an area where the first sealant 8 contacts the supporting member 3

The deformation and the positional deviation of the recording element substrate 2 generate when the temperature of the sealants 8 and 9 falls from the curing temperature after the sealants 8 and 9 have been cured. In other words, that problem occurs even when the recording element substrate 2 and the supporting member 3 have the same linear expansion rate.

The results of actually measuring the deformation and the positional deviation of the recording element substrate 2 in tests for proving the method of manufacturing the ink-jet recording head according to the exemplary embodiment will be described in detail below with reference to FIGS. 12 to 14.

Dimensions and physical property values of the individual components of the ink-jet recording head 1 used in measuring the deformation and the positional deviation of the recording element substrate 2 are as follows.

The recording element substrate 2 is a silicon substrate (having dimensions of 24 mm×7.7 mm×0.625 mm, an elastic modulus of 100 GPa or more, and a linear expansion rate of about 2.6 ppm). The supporting member 3 is an alumina plate (having dimensions of 183 mm×26 mm×5 mm, an elastic modulus of about 400 GPa, and a linear expansion rate of about 5 to 7 ppm). The first sealant 8 and the second sealant 9 have elastic moduli of about 6 Gpa and about 9 GPa and linear expansion rates of about 25 ppm and about 15 ppm, respectively. The interval between the recording element substrate 2 and the electric wiring member 4 at room temperature is about 0.5 mm, and the curing temperature of the sealants is 150° C.

Figure 12:
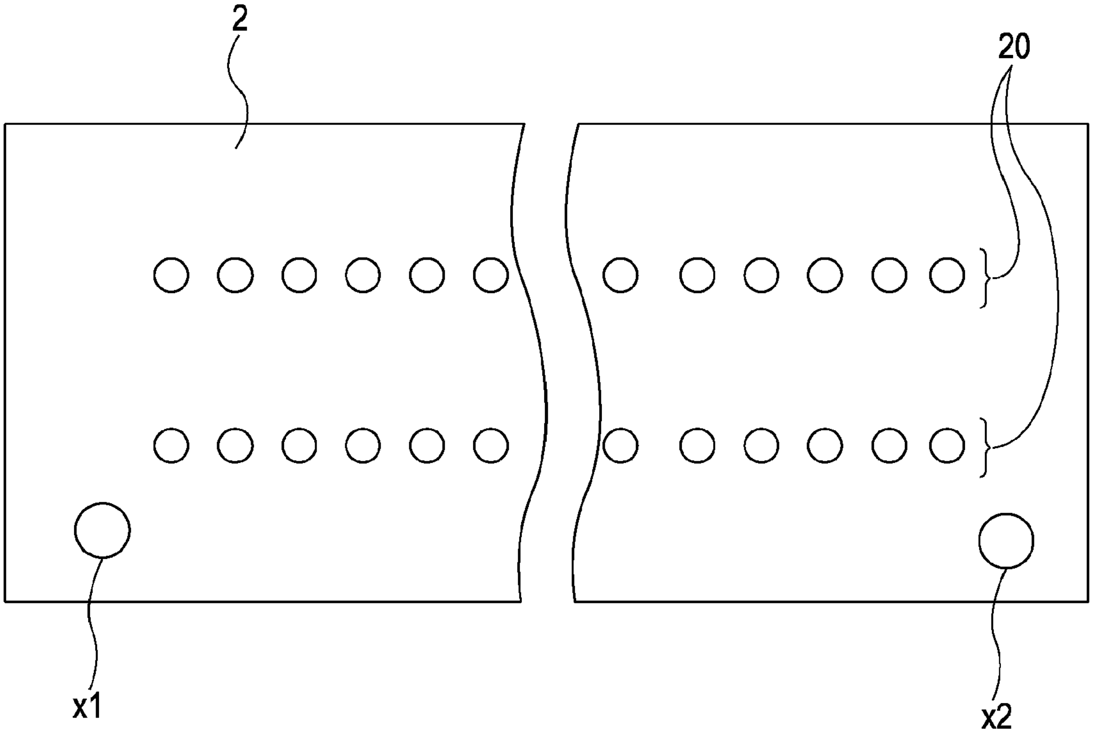
FIG. 12 is a plan view illustrating, in an enlarged scale, part of the recording element substrate according to the exemplary embodiment of the present invention.

FIG. 12 is a plan view illustrating, in an enlarged scale, part of the recording element substrate 2 used in the measurement. Two reference positions x1 and x2 are set near both ends of the recording element substrate 2, respectively, on a straight line extending parallel to the direction of the nozzle ray 20. The deformation and the positional deviation of the recording element substrate 2 are measured on the basis of the reference positions x1 and x2. While the exemplary embodiment is described, for example, in connection with the case where two reference positions are set on the recording element substrate, three or more reference positions may also be set as required.

Figure 13:
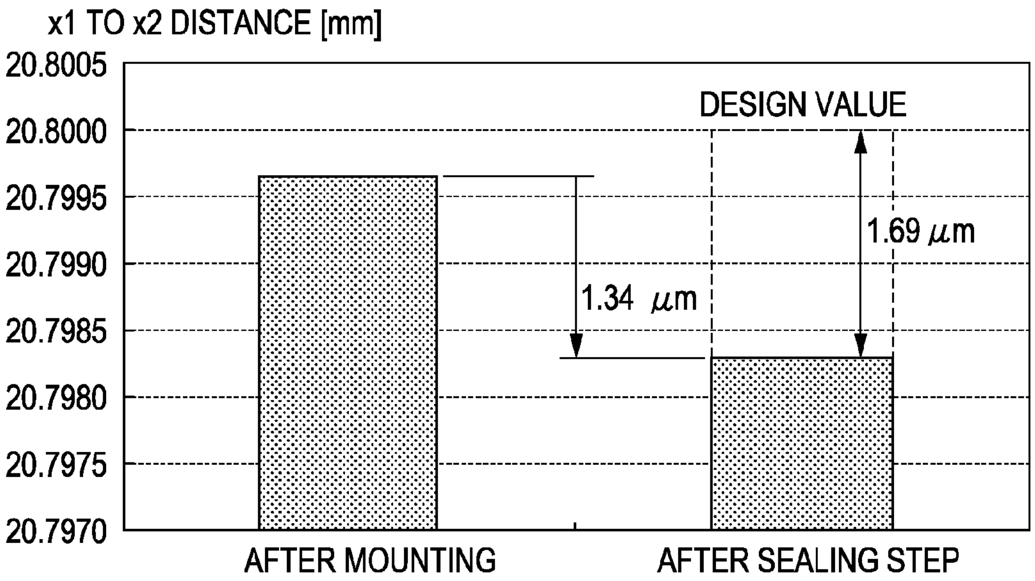
FIG. 13 is a graph illustrating the results of measuring a distance between reference positions before and after a sealing step for the recording element substrates according to the exemplary embodiment of the present invention.

FIG. 13 illustrates the results of measuring a distance between the two reference positions x1 and x2 after mounting the recording element substrate 2 to the supporting member 3 (i.e., before a sealing step) and after the end of the sealing step. More specifically, each of the results in FIG. 13 indicates an average of values obtained by measuring forty recording element substrates 2. The difference between two measured distances substantially represents the lengthwise direction of the recording element substrate 2 between before and after the sealing step, i.e., the amount of actual deformation of the recording element substrate 2 itself, which has generated during the sealing step. The difference in the measured distance between before and after the sealing step is 1.34 μm in average. Taking into account variations occurred in manufacturing the recording element substrates 2, the amount of deformation from the intended distance, i.e., from the design distance (20.8 mm) for the recording element substrate 2, is 1.69 μm.

Thus, in the case of the ink-jet recording head 1 having the above-described construction, the recording element substrate 2 contracts at least in the direction of the nozzle array 20 through the sealing step. Further, the reference positions x1 and x2 deviate in themselves. FIG. 14 illustrates the results of measuring the deviations of the reference positions x1 and x2. In FIG. 14, the vertical axis represents respective deviations of the reference positions x1 and x2 from the design values (ideal values) for the recording element substrates 2. Each value of the deviations is positive when the reference positions x1 and x2 are moved to the right in the direction of the nozzle array 20 as viewed in FIG. 12. Thus, as seen from FIG. 14, the two reference positions x1 and x2 are moved in directions coming closer to each other through the curing step.

Figure 15A:
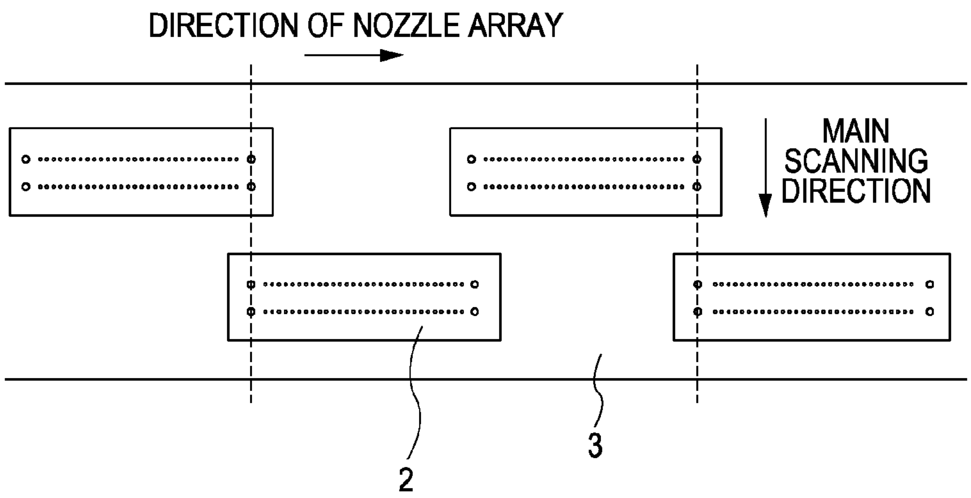
FIGS. 15A and 15B are plan views illustrating respective positions of the recording element substrates according to the exemplary embodiment of the present invention before and after the sealing step.
Figure 15B:
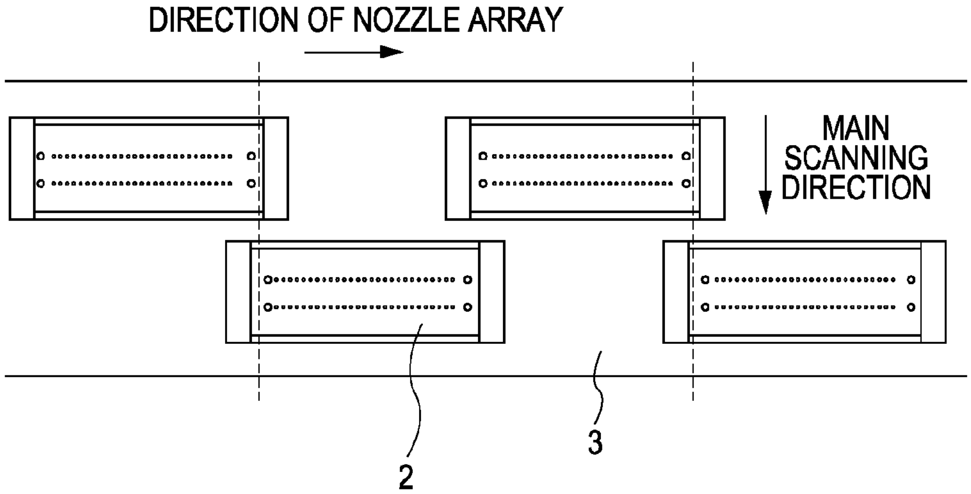

FIGS. 15A and 15B illustrate respective positions of the recording element substrates 2 before and after the sealing step, when the recording element substrates 2 deform as described above. It is here assumed that, as illustrated in FIG. 15A, the recording element substrates 2 are arranged in the mounting step such that respective nozzle array ends of adjacent two of the recording element substrates 2 on each side where those nozzle array ends are overlapped are aligned with each other in the main scanning direction (i.e., positioned to lie on a dotted line in FIG. 15A). In the above case, each recording element substrate 2 deforms through the sealing step such that both the ends thereof come closer to each other. As a result, the nozzle positions in each recording element substrate 2, in particular, the positions of the nozzle array ends of the recording element substrate 2, are deviated after the sealing step, i.e., after the end of the manufacturing process (see FIG. 15B).

With the method of manufacturing the ink-jet recording head 1 according to the exemplary embodiment, the deformation and the positional deviation of the recording element substrate 2, which may generate in the sealing step, are previously obtained on the basis of the above-described measurement results, and the mounted position of the recording element substrate 2 is adjusted in consideration of the measured deformation and positional deviation of the recording element substrate 2. A concrete manner of mounting the recording element substrates 2 in consideration of the deformation and the positional deviation thereof will be described below with reference to FIGS. 16A and 16B.

Figure 16A:
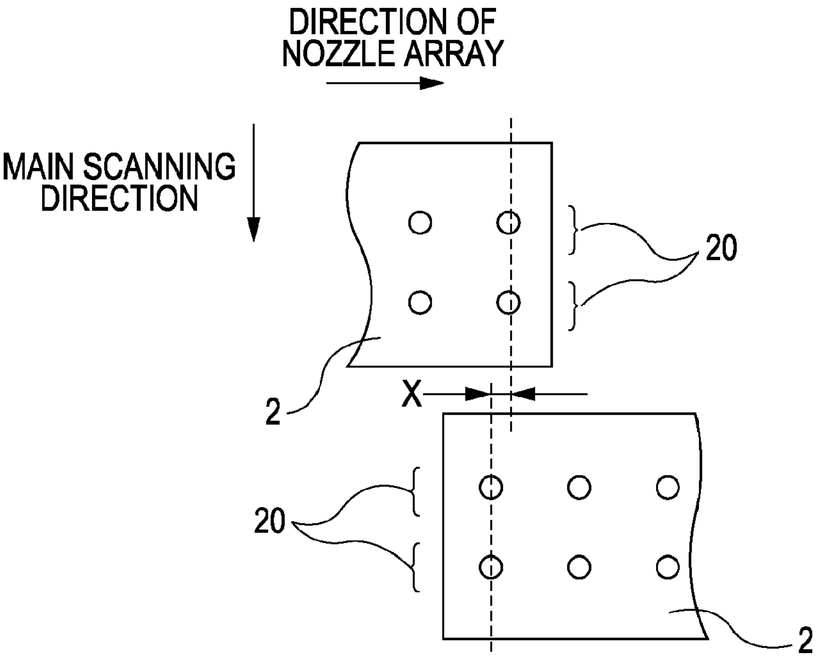
FIGS. 16A and 16B are explanatory views illustrating the method of manufacturing the ink-jet recording head according to the exemplary embodiment of the present invention.
Figure 16B:
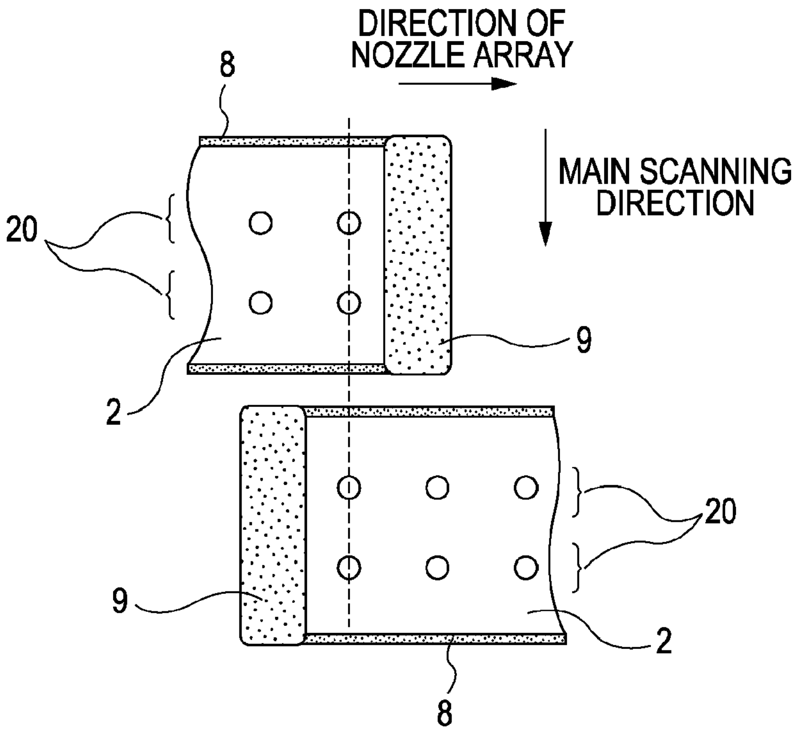

FIGS. 16A and 16B are explanatory views illustrating states of the recording element substrates 2 before and after the step of sealing the recording element substrates 2 with the sealants 8 and 9 by the method of manufacturing the ink-jet recording head according to the exemplary embodiment.

The proper arrangement of the recording element substrates 2 in the ink-jet recording head 1, manufactured by the manufacturing method according to the exemplary embodiment, is as per described above. Stated another way, in order to realize high-definition recording by a long recording head, as illustrated in FIG. 16B, two recording element substrates adjacent to each other in the main scanning direction are arranged such that respective nozzle array ends of the recording element substrates on the side where those nozzle array ends are positioned close to each other are accurately overlapped as viewed in the main scanning direction. The following description is made on the concrete manner of mounting the recording element substrates 2 to realize the above-described arrangement with the manufacturing method according to the exemplary embodiment by referring to FIGS. 16A and 16B.

Figure 14:
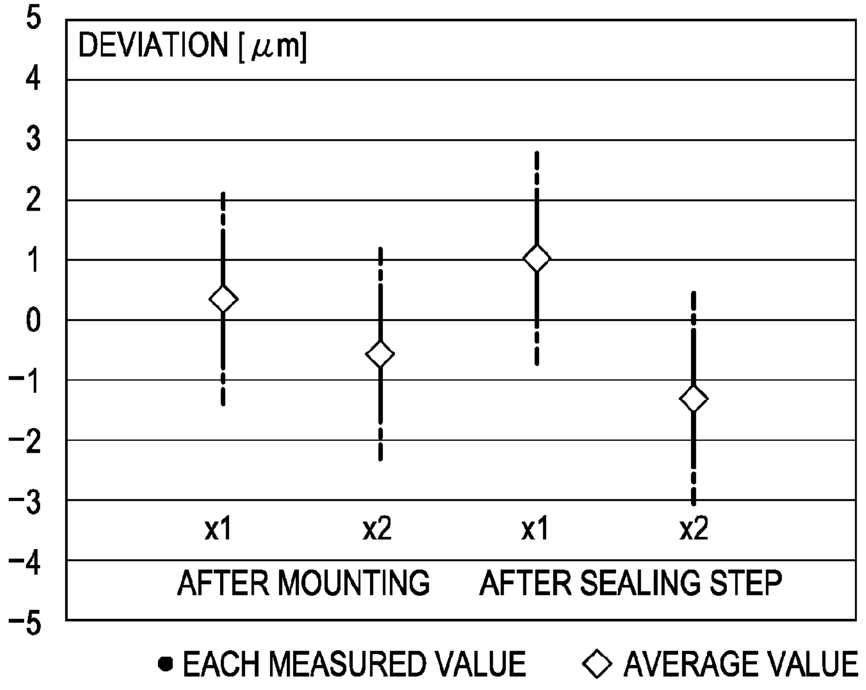
FIG. 14 is a graph illustrating the results of measuring respective deviations of the reference positions before and after the sealing step for the recording element substrates according to the exemplary embodiment of the present invention.
Figure 17A:
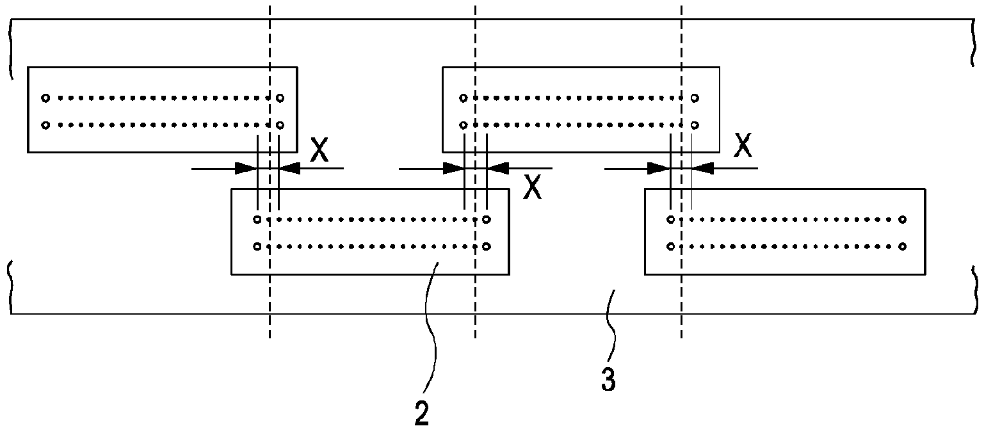
FIGS. 17A and 17B are explanatory views illustrating the method of manufacturing the ink-jet recording head according to the exemplary embodiment of the present invention.
Figure 17B:
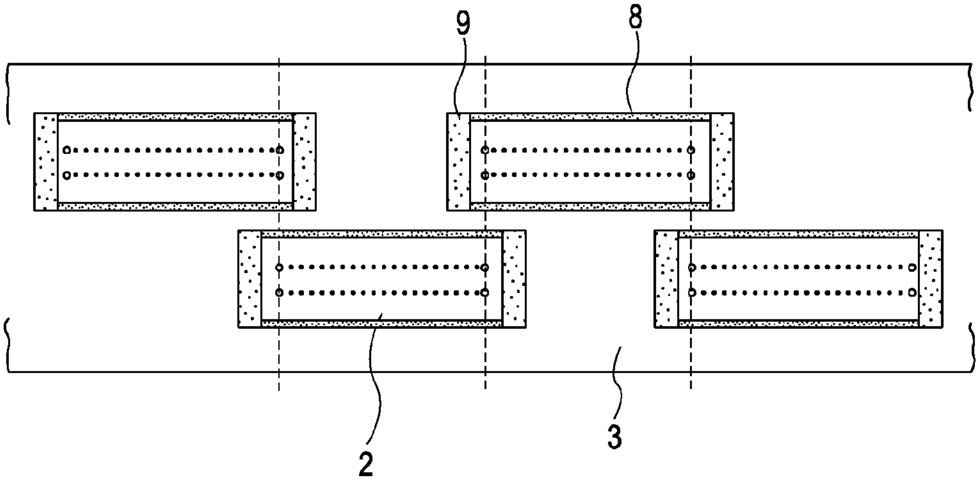

The deviations of the reference positions x1 and x2 after the end of the sealing step are each about 1 μm as seen from FIG. 14. With the manufacturing method according to the exemplary embodiment, therefore, the recording element substrates 2 are mounted to the supporting member 3 such that the positions of each recording element substrate near the ends thereof are shifted by the same amounts as the respective measured deviations of the reference positions in directions to compensate for those deviations of the reference positions. More specifically, each recording element substrate is mounted in a state where the left end as viewed in FIG. 16A is shifted 1 μm to the left and the right end as viewed in FIG. 16A is shifted 1 μm to the right. Thus, as illustrated in FIG. 16A, the recording element substrates 2 are mounted to the supporting member 3 such that the distance between the nozzles at respective nozzle array ends of the recording element substrates 2 adjacent to each other is set to 2 μm in total, which represents a correction amount X. Consequently, the desired arrangement, i.e., the arrangement illustrated in FIG. 16B, can be realized in the state after the manufacturing process as the result of the deformations and the positional deviations of the recording element substrates 2, which generate during the sealing step. FIGS. 17A and 17B illustrate states of the plural recording element substrates 2 before and after the sealing step, respectively, in consideration of the deformation and the positional deviation of each recording element substrate 2.

Figure 18:
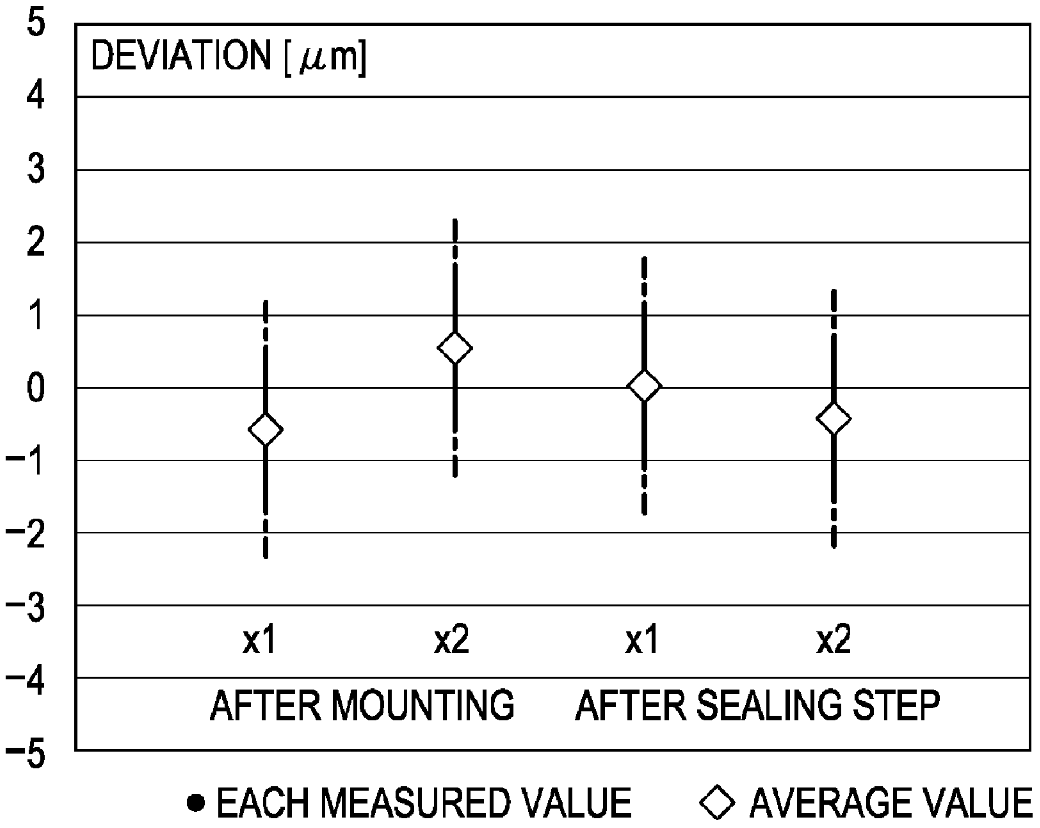
FIG. 18 is a graph illustrating the measured results of respective deviations of the reference positions before and after the sealing step for the recording element substrate manufactured by the method of manufacturing the ink-jet recording head according to the exemplary embodiment of the present invention.

FIG. 18 illustrates the results of verifying whether the deviations of the reference positions are actually corrected by using the above-described manufacturing method. Measurement conditions, etc. are the same as those described above with reference to FIG. 14. By employing the manufacturing method according to the exemplary embodiment, as seen from FIG. 18, the reference positions x1 and x2 are located at positions closer to the desired ones (deviation=0) after the sealing step than those illustrated in FIG. 14.

With the method of manufacturing the ink-jet recording head according to the exemplary embodiment, the positional deviations of the recording element substrates 2, which generate during the manufacturing process, are measured in advance and the recording element substrates are mounted to the supporting member 3 at the positions adapted to compensate for the measured positional deviations. Therefore, the recording element substrates 2 after the end of the manufacturing process can be arranged at the desired positions with a high degree of accuracy, and high-definition and high-quality recording can be realized even with a long ink-jet recording head.

In the above-described exemplary embodiment, the average value of the positional deviations of the plural recording element substrates 2 is used as the amount for correcting the deformation and the positional deviation generated in each of the recording element substrates 2, and the mounted positions of the recording element substrates 2 are all corrected by a certain fixed amount. According to another exemplary embodiment of the present invention, when the deformations of the recording element substrates 2 differ in amounts from each other, the mounted positions of the recording element substrates 2 can be adjusted for each substrate depending on the amount of the deformation thereof.

Figure 19A:
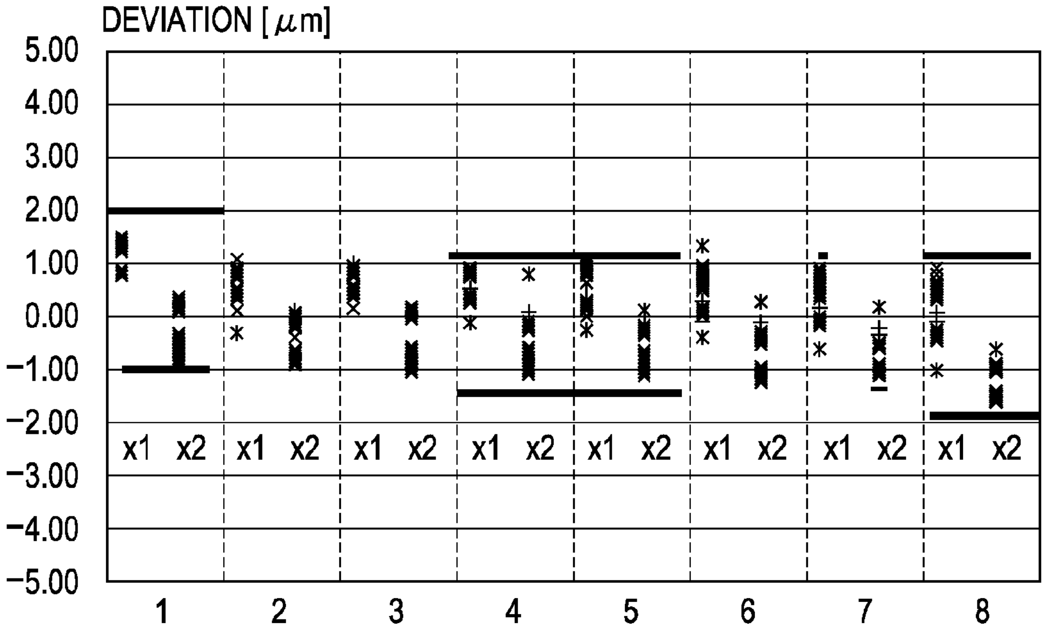
FIGS. 19A and 19B illustrate the measured results of respective deviations at the reference positions before and after the sealing step for individual recording element substrates according to another exemplary embodiment of the present invention.
Figure 19B:
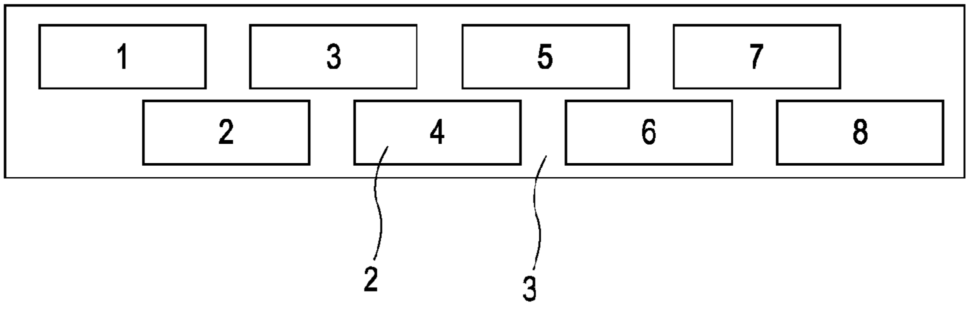

FIG. 19A illustrates the results of measuring the positional deviations of the recording element substrates 2 after the sealing step at 8 sets of 16 reference positions in total when eight recording element substrates 2 are mounted to the supporting member 3. FIG. 19B illustrates respective positions of the recording element substrates 2 on the supporting member 3. Measurement conditions, etc., including the reference positions x1 and x2, are the same as those described above with reference to FIGS. 14 and 18.

Figure 20A:
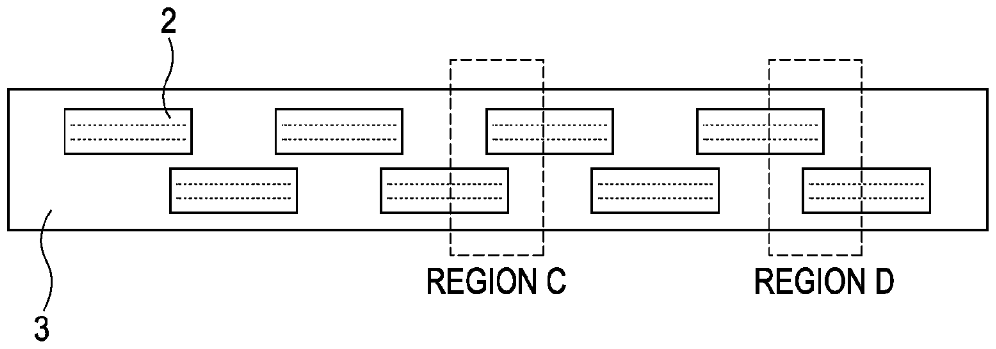
FIGS. 20A, 20B and 20C are explanatory views illustrating a method of manufacturing the ink-jet recording head according to another exemplary embodiment of the present invention.
Figure 20B:
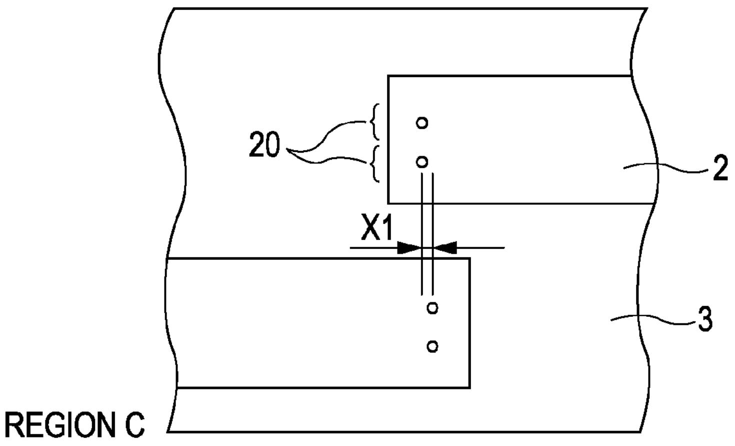
Figure 20C:
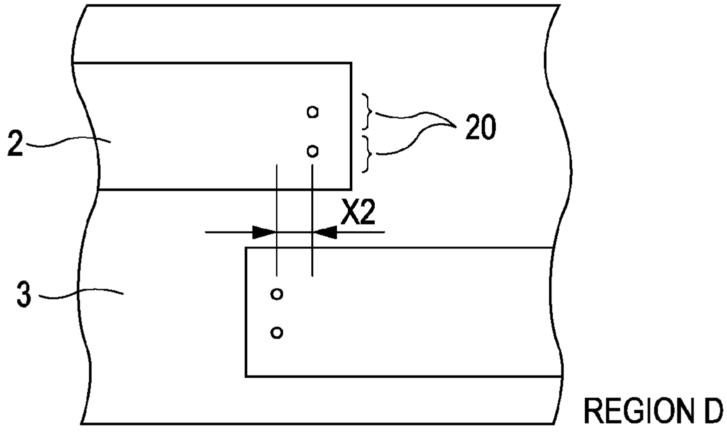

As seen from FIG. 19A, the recording element substrate 2 arranged nearer to the end of the supporting member 3 tends to deform in a larger deviation than that of the recording element substrate 2 arranged nearer to the center of the supporting member 3. In such a case, when the recording element substrates 2 are mounted to the supporting member 3, the recording element substrates 2 can be each caused to move depending on the positional deviation thereof by using, as the correction amount, the positional deviation of each recording element substrate 2. In practice, the mounted position of each recording element substrate can be adjusted as illustrated in FIGS. 20A and 20B. More specifically, the mounted position of each recording element substrate 2 can be adjusted such that correction amounts X1 and X2 in a region C near the center of the supporting member 3 and in a region D near the end thereof (see FIG. 20A), respectively, are set to be X1<X2 (see FIGS. 20B and 20C). As a result, the recording element substrates 2 can be each held at the desired position after the sealing step, and the ink-jet recording head including the recording element substrates 2 arranged with a higher degree of accuracy can be obtained.

While, in the above-described measurement, the recording element substrates 2 generate a larger positional deviation near the end of the supporting member 3 than the center thereof, the actual positional deviations of the recording element substrates 2 are determined depending on the shapes, the dimensions, the physical properties, etc. of the relevant components. Adjusting the mounted position of each recording element substrate 2 depending on the positional deviation thereof, as described above, is also advantageous in being adaptable for changes in positional deviations of the individual recording element substrates 2 that may occur based on differences in constructions of the recording element substrates 2.

Figure 21:
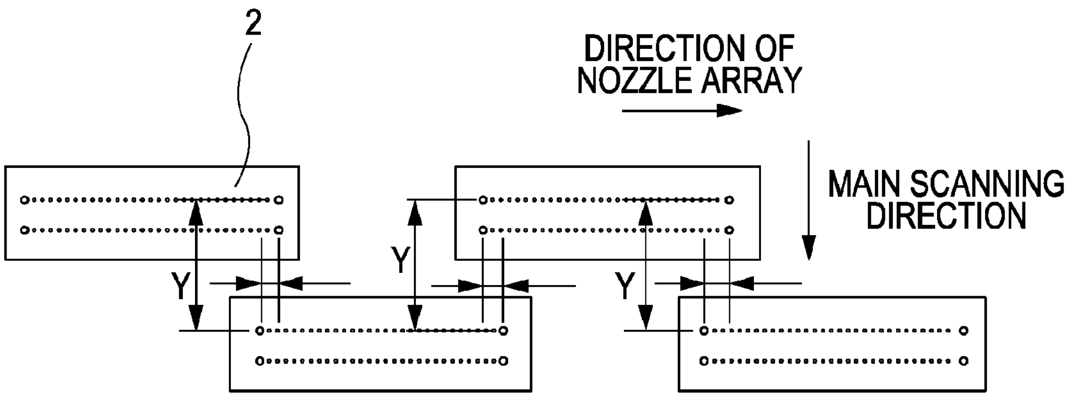
FIG. 21 is an explanatory view illustrating a method of manufacturing the ink-jet recording head according to still another exemplary embodiment of the present invention.

While the above description has been made as correcting the mounted positions of the recording element substrates 2 only in the nozzle array direction, the direction in which the mounted positions are corrected is not limited to the nozzle array direction. As illustrated in FIG. 21, the mounted positions can also be corrected in the main scanning direction that is perpendicular to the nozzle array direction. For example, the mounted positions of the plural recording element substrates 2 can be adjusted such that those substrates are arranged parallel to each other, as viewed in the nozzle array direction, with a high degree of accuracy while intervals (distances) Y in FIG. 21 are held constant after the sealing step.

Additionally, in order to maximize the advantages of the above-described method of manufacturing the ink-jet recording head, variations in the deformations and the positional deviations of the recording element substrates 2 require to be suppressed minimum. From that point of view, it is important to closely control the amount of the applied sealant because the deformation and the positional deviation of each recording element substrate 2 changes depending on, e.g., variations in the amount of the first sealant 8 applied.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-233335 filed Sep. 11, 2008, which is hereby incorporated by reference herein in its entirety.

What is claimed is:

1. A method of manufacturing an ink-jet recording head including a plurality of recording element substrates each having at least one nozzle array comprising a plurality of nozzles to eject ink, an electric wiring member arranged to supply signals to the plurality of recording element substrates, a supporting member arranged to support the plurality of recording element substrates and the electric wiring member, electric connecting portions electrically interconnecting the recording element substrates and the electric wiring member, and a sealant sealing the electric connecting portions, the method comprising the steps of:

applying sealants to the supporting member including the recording element substrates, the electric wiring member, and the electric connecting portions, and curing the applied sealants by heating the sealants;

measuring a distance between at least two reference positions set on each of the recording element substrates before and after the curing of the sealants; and mounting the plurality of recording element substrates to the supporting member depending on a difference in the distance between the reference positions measured in the measuring step before and after the curing of the sealants.

2. The method of manufacturing the ink-jet recording head according to claim 1, wherein the difference in the distance is measured in the measuring step based on two reference positions set near both ends of each of the recording element substrates.

3. The method of manufacturing the ink-jet recording head according to claim 2, wherein the two reference positions are located apart from each other in a direction of the nozzle array.

4. The method of manufacturing the ink-jet recording head according to claim 1, wherein the difference in the distance is measured in the measuring step in a direction of the nozzle array.

5. The method of manufacturing the ink-jet recording head according to claim 1, wherein the difference in the distance is measured in the measuring step in a direction perpendicular to a direction of the nozzle array.

6. The method of manufacturing the ink-jet recording head according to claim 1, wherein the difference in the distance between the two reference positions is measured in the measuring step for each of the recording element substrates, and each of the recording element substrates is mounted in the mounting step depending on an average value of the measured differences in the distances between every two reference positions on the individual recording element substrates.

7. A method of manufacturing an ink-jet recording head including a pair of recording element substrates being adjacent to each other and having at least one nozzle array comprising a plurality of nozzles to eject ink, an electric wiring member arranged to supply signals to the pair of recording element substrates, a supporting member arranged to support the pair of recording element substrates and the electric wiring member, electric connecting portions disposed between the recording element substrates and the electric wiring member, and a sealant sealing the electric connecting portions, the method comprising the steps of:

measuring a positional deviation of each of the recording element substrates at a position near each end thereof, the deviation being generated due to thermal deformations of the recording element substrate and the sealant; and mounting the pair of recording element substrates to the supporting member, forming the electric connecting portions, applying the sealant to the electric connecting portions, and sealing the electric connecting portions with the applied sealants by heating and cooling the sealants, wherein the pair of recording element substrates are mounted to the supporting member in the mounting step such that the position of each of the recording element substrates near each end thereof is set to be shifted in amount corresponding to the positional deviation measured in the measuring step.

8. A method of manufacturing an ink-jet recording head including a plurality of recording element substrates each having at least one ejection orifice array comprising a plurality of ejection orifices to eject ink, an electric wiring member arranged to supply signals to the plurality of recording element substrates, a supporting member arranged to support the plurality of recording element substrates and the electric wiring member, electric connecting portions electrically interconnecting the recording element substrates and the electric wiring member, and a sealant sealing the electric connecting portions, the method comprising the steps of:

mounting the plurality of recording element substrates to the supporting member depending on a difference between an interval of two reference positions on each of the recording element substrates disposed on the supporting member before curing of the sealant and an interval of the two reference positions after the curing of the sealant, the difference being measured in advance, such that positions of the ejection orifices at respective ends of the ejection orifice arrays in adjacent two of the plurality of recording element substrates, on the side where the respective ends are positioned close to each other, are shifted in a direction of the ejection orifice array;

electrically connecting the electric wiring member and the recording element substrates to each other; and applying the sealant to the electric connecting portions and curing the applied sealant by heating the sealant.

* * * * *